W. D. COOLIDGE.
METHOD OF JOINING UNLIKE METALS.
APPLICATION FILED MAR. 20, 1912.

1,101,062.

Patented June 23, 1914.

WITNESSES:
Anthony Mart,
J. Ellis Glen

INVENTOR:
WILLIAM D. COOLIDGE,
BY Albert G. Davis
HIS ATTORNEY.

UNITED STATES PATENT OFFICE.

WILLIAM D. COOLIDGE, OF SCHENECTADY, NEW YORK, ASSIGNOR TO GENERAL ELECTRIC COMPANY, A CORPORATION OF NEW YORK.

METHOD OF JOINING UNLIKE METALS.

1,101,062. Specification of Letters Patent. Patented June 23, 1914.

Application filed March 20, 1912. Serial No. 685,113.

*To all whom it may concern:*

Be it known that I, WILLIAM D. COOLIDGE, a citizen of the United States, residing at Schenectady, county of Schenectady, State of New York, have invented certain new and useful Improvements in Methods of Joining Unlike Metals, of which the following is a specification.

My invention comprises a method of joining or soldering copper or the like to other metals such as tungsten, so as to obtain most intimate, strong mechanical junction which will therefore have the best electrical and heat conductivity.

Tungsten cannot be joined satisfactorily to other metals by soldering in the ordinary manner. This difficulty is apparently due to the ease with which a thin film of oxid forms on the surface of the tungsten. The soldering metal either will not stick or when apparent adhesion has been produced I find that when subjected to any strain the soldering metal breaks away as though the tungsten broke away from the film of oxid.

Figure 1:
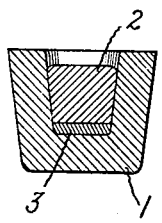
Figure 2:
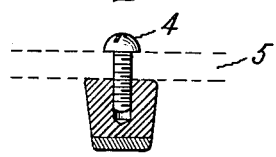

In the accompanying drawings, Figure 1 shows a container in which a body of copper is cast directly into contact with a piece of tungsten; Fig. 2 shows a machined contact attached to a support.

In carrying out the process, I find it highly desirable to completely remove from the surface of the tungsten body all the loosely adherent metal or oxid which I find is left by the preliminary process of shaping the tungsten. Unless this is done, I find that in some cases the tungsten may be torn away from its backing or support at this loosely adherent surface layer, part of which will be found clinging to the copper or other metal used as solder. In order to remove this surface layer I prefer to bring the body of tungsten into contact with melted nitrite of sodium or potassium for a few seconds or with hot caustic potash or caustic soda solution for a longer time. This leaves a perfectly bright surface of solid metal.

Ordinarily copper by reason of its dissolved gases or other impurities will not wet the surface of tungsten. Either the tungsten acts as a deoxidizer with respect to the copper and becomes coated with oxid or dissolved oxids of copper lower the surface tension of copper relatively to tungsten. I have found, however, that if the melted copper is treated previous to casting with a small quantity of an oxidizable boron material such as elemental boron, boron suboxid or boron carbid, which combines with the dissolved impurities, the copper will then wet and permanently adhere to the surface of the tungsten. This process of purifying copper is described in an application filed by E. Weintraub, Patent #1,023,604 of April 16, 1912.

Elemental boron and boron carbid are now well known to chemists. Boron suboxid is the product of the reduction of boric anhydrid with magnesium at a temperature of 1300 deg. C. or higher. The reduction mass left after washing with dilute sulfuric acid is a brown powder. The treatment of the copper is carried out by adding 1/30 to 1/10 of 1% or more of boron or of a boron compound containing an equivalent amount of boron in the reduced state while the copper is heated considerably above its melting point, say 1200 to 1300 deg. C. or higher. The copper thus prepared is then cast into contact with the tungsten body which may for example be placed in the bottom of a magnesia or alumina crucible 1 as shown in Fig. 1. After cooling, the mass of copper 2 and tungsten plate 3 thus joined together is removed and the copper may be machined so as to attach it in any approved manner to electrical apparatus. Fig. 2 is illustrative of a contact made in this way, the copper 2 being attached by means of a screw 4 to the supporting part 5 indicated by dotted lines.

In accordance with my invention, I may cause the purification and attachment of copper to the body of tungsten, molybdenum, or other refractory, oxidizable metal to take place in one operation. This may be done by placing the disk of tungsten, for example, in the bottom of a crucible as shown in Fig. 1, placing the boron material upon the tungsten and then adding copper. The contents of the crucible are then heated to a temperature several hundred degrees in excess of the melting point of copper. The exclusion of air during the heating process is not essential although desirable.

What I claim as new and desire to secure by Letters Patent of the United States, is:—

1. The method of joining a body of tungsten to a body of copper which consists in bringing said copper while molten and while chemically modified by reaction with an oxidizable boron material into contact with tungsten.

2. The method of joining a tungsten body to a body of copper which consists in treating the copper at a temperature above its melting point with an oxidizable boron material and then casting it into contact with the tungsten body.

In witness whereof I have hereunto set my hand this 18th day of March, 1912.

WILLIAM D. COOLIDGE.

Witnesses:
BENJAMIN B. HULL,
HELEN ORFORD.